United States Patent
O'Rear et al.

(10) Patent No.: US 6,992,114 B2
(45) Date of Patent: Jan. 31, 2006

(54) CONTROL OF $CO_2$ EMISSIONS FROM A FISCHER-TROPSCH FACILITY BY USE OF MULTIPLE REACTORS

(75) Inventors: Dennis J. O'Rear, Petaluma, CA (US); Charles L. Kibby, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/720,675

(22) Filed: Nov. 25, 2003

(65) Prior Publication Data

US 2005/0113465 A1    May 26, 2005

(51) Int. Cl.
*C07C 27/00*    (2006.01)

(52) U.S. Cl. .................. 518/706; 700/705; 700/715

(58) Field of Classification Search ................ 518/700, 518/705, 706, 715
See application file for complete search history.

(56) References Cited

U.S. PATENT DOCUMENTS

| | | | |
|---|---|---|---|
| 4,279,830 A | 7/1981 | Haag et al. | |
| 4,542,122 A | 9/1985 | Payne et al. | |
| 4,568,663 A | 2/1986 | Mauldin | |
| 4,621,072 A | 11/1986 | Arntz et al. | |
| 4,624,968 A | 11/1986 | Kim et al. | |
| 4,663,305 A | 5/1987 | Mauldin et al. | |
| 5,423,894 A | 6/1995 | Child et al. | |
| 5,545,674 A | 8/1996 | Behrmann et al. | |
| 5,689,031 A | 11/1997 | Berlowitz et al. | |
| 6,147,126 A | 11/2000 | DeGeorge et al. | |
| 6,156,809 A * | 12/2000 | Clark et al. ................. | 518/719 |
| 6,169,120 B1 | 2/2001 | Beer | |
| 6,512,018 B2 * | 1/2003 | Kennedy .................... | 518/715 |
| 6,693,138 B2 | 2/2004 | O'Rear | |
| 6,703,429 B2 | 3/2004 | O'Rear | |

FOREIGN PATENT DOCUMENTS

| | | |
|---|---|---|
| EP | 0679620 A2 | 11/1995 |
| EP | 0921184 A1 | 6/1999 |
| RU | 2089533 | 4/1994 |
| WO | 00/63141 A1 | 10/2000 |

OTHER PUBLICATIONS

Can Carbon Dioxide be Reduced to High Molecular Weight in Fischer-Tropsch Products?, In re Puskas, ACS 213 National Meeting, San Francisco, ACS Division of Fuel Chemistry Preprints 42(2):680-686 (1997).

(Continued)

*Primary Examiner*—J. Parsa
(74) *Attorney, Agent, or Firm*—Buchanan Ingersoll PC

(57) ABSTRACT

$CO_2$ emissions from Fischer-Tropsch facilities are controlled by using multiple reactors. A process for the conversion of syngas using multiple Fischer-Tropsch reactors comprises reacting at least a portion of a first syngas in a first Fischer-Tropsch reactor to form a first hydrocarbonaceous product and a second syngas. The second syngas is mixed with a $H_2$-containing stream to form an adjusted syngas. At least a portion of the adjusted syngas is reacted in a second Fischer-Tropsch reactor to form a second hydrocarbonaceous product and a third syngas. At least a portion of the first and second hydrocarbonaceous products are blended to obtain a blended hydrocarbonaceous product.

18 Claims, 2 Drawing Sheets

OTHER PUBLICATIONS

"Iron Catalyzed CO2 Hydrogenation to Liquid Hydrocarbons", 4th International Carbon Dioxide Utilization Conference, Kyoto, Japan *Studies in Surface Science and Catalysis* 114:339-344 (1998).

U.S. Appl. No. 10/720,674, O'Rear et al., *Gas-to Liquid CO2 Reduction by Use of H2 as a Fuel*, filed on Nov. 25, 2003.

U.S. Appl. No. 10/720,673, O'Rear et al., *Control of CO2 Emissions from a Fischer-Tropsch Facility by Use of Dual Functional syngas Conversion*, filed on Nov. 25, 2003.

U.S. Appl. No. 10/118,029, O'Rear, *Reducing $CO_2$ Levels in $CO_2$-Rich Natural Gases Converted into Liquid Fuels*, filed Apr. 9, 2002.

* cited by examiner

Figure 1. Conventional Fischer Tropsch Process

CONTROL OF $CO_2$ EMISSIONS FROM A FISCHER-TROPSCH FACILITY BY USE OF MULTIPLE REACTORS

FIELD OF THE INVENTION

The present invention is directed to controlling $CO_2$ emissions from Fischer-Tropsch facilities. In particular, the present invention is directed to controlling $CO_2$ emissions from a Fischer-Tropsch facility by using multiple reactors.

BACKGROUND OF THE INVENTION

The conversion of natural gas assets into more valuable products, including combustible liquid fuels, is desired to more effectively utilize these natural gas assets. The conversion of natural gas to more valuable products generally involves syngas generation. Syngas generation involves converting natural gas, which is mostly methane, to synthesis or syngas gas, which is a mixture of carbon monoxide and hydrogen. Syngas may be used as a feedstock for producing a wide range of products, including combustible liquid fuels, methanol, acetic acid, dimethyl ether, oxo alcohols, and isocyanates.

There are two main approaches to convert remote natural gas assets into conventional transportation fuels and lubricants using syngas. Natural gas may be converted into syngas followed by a Fischer-Tropsch process, or natural gas may be converted into syngas followed by methanol synthesis, which is followed by a methanol to gas process (MTG) to convert methanol into highly aromatic gasoline. The syngas generation is the most costly step of these processes. A critical feature of these processes is producing syngas with a desired $H_2/CO$ ratio to optimize formation of the desired products and to avoid problems in the syngas formation step. Unless otherwise stated, syngas ratios (and percentage compositions) as described herein are in terms of molar ratios (and molar percentages).

Syngas can be generated from three major chemical reactions. The first involves steam reforming of methane. The ratio of hydrogen to carbon monoxide, which is formed from this process, is typically approximately 3.0. A second process for syngas generation involves dry reforming of methane or the reaction between carbon dioxide and methane. An attractive feature of this method is that carbon dioxide is converted into syngas; however, this method has problems with rapid carbon deposition. The carbon deposition or coke forming reaction is a separate reaction from the one that generates the syngas and occurs subsequent to the syngas formation reactor. However, the reaction of methane in dry reforming is slow enough that long residence times are required for high conversion rates and these long residence times lead to coke formation. The ratio of hydrogen to carbon monoxide, which is formed from this process, is typically approximately 1.0. A third process for synthesis gas generation involves partial oxidation of methane using oxygen. The ratio of hydrogen to carbon monoxide, which is formed from this process, is typically approximately 2.0. However, in commercial practice, some amount of steam is typically added to a partial oxidation reformer in order to control carbon formation and the addition of steam tends to increase the $H_2/CO$ ratio above 2.0.

It is possible to produce syngas with a $H_2/CO$ ratio that is above the ratio ideally desired for the process in which the syngas is to be used, and then to remove excess hydrogen to adjust the ratio to the desired value. However, the $H_2$ removal process employs expensive $H_2$ separation systems that tend to foul and decline in performance with use.

The Fischer-Tropsch and MTG processes both have advantages and disadvantages. For instance, the Fischer-Tropsch process has the advantage of forming products that are highly paraffinic. Highly paraffinic products are desirable because they exhibit excellent combustion and lubricating properties. Unfortunately, a disadvantage of the Fischer-Tropsch process is that the Fischer-Tropsch process emits relatively large amounts of $CO_2$ during the conversion of natural gas assets into saleable products. An advantage of the MTG process is that the MTG process produces highly aromatic gasoline and LPG fractions (e.g., propane and butane). However, while highly aromatic gasoline produced by the MTG process is generally suitable for use in conventional gasoline engines, highly aromatic MTG gasoline may be prone to form durene and other polymethyl aromatics having low crystallization temperatures that form solids upon standing. In addition, the MTG process is more expensive than the Fischer-Tropsch process and the products produced by the MTG process cannot be used for lubricants, diesel engine fuels or jet turbine fuels. Furthermore, like the Fischer-Tropsch process, the MTG process also generates $CO_2$.

It is known to use multiple Fischer-Tropsch reactors for various purposes. For instance, U.S. Pat. No. 6,169,120, to Beer of Syntroleum, discloses a two-stage Fischer-Tropsch process employing intermediate $H_2O$ removal. The process of Beer is intended to be used to process syngas produced from air that will contain appreciable amounts of nitrogen.

U.S. Pat. No. 4,279,830, to Haag et al. of Mobil, discloses a zeolite-containing catalyst used to maintain a syngas composition so that a $H_2:CO$ ratio is in a range of about 0.5 to about 1.0. Haag explains that this range is appropriate for Fe-based FT catalysts, but is not suitable for Co-based catalysts. A second FT catalyst contains Fe but does not contain a zeolite. This catalyst makes a minimal change in the $H_2:CO$ ratio. Haag also explains that operating within a selective range of process conditions provides an improved process for upgrading the total effluent from a Fischer-Tropsch operation.

U.S. Pat. No. 4,624,968, to Kim et al. of Exxon, discloses a two-stage Fischer-Tropsch process using specific catalysts intended for olefin synthesis and conversion.

WO/0063141, to Clark et al. of Reema International Corp., discloses a Fischer-Tropsch process for synthesizing hydrocarbons that includes multiple Fischer-Tropsch reactor stages arranged in series. The process of Clark provides very low CO conversion per Fischer-Tropsch reactor stage and employs intermediate removal of water between reactor stages. In one embodiment, the process of Clark uses an iron-based catalyst. In a preferred embodiment, $CO_2$ is recycled from the last reactor in a series of Fischer-Tropsch reactors to the syngas generator.

EP 0679620 A2, to Long of Exxon, discloses a high conversion hydrocarbon synthesis achieved by reacting $H_2$ and CO in a first stage(s) in the presence of a non-shifting catalyst. The process further includes separating liquid products and reacting the remaining gas streams in the presence of shifting catalysts.

Additionally, various technologies have been used for the conversion of $CO_2$. For instance, "Can Carbon Dioxide be Reduced to High Molecular Weight in Fischer-Tropsch Products?," In re Puskas, ACS 213 National Meeting (San Francisco Apr. 13–17, 1997) ACS Division of Fuel Chemistry Preprints, V. 42, N. 2, 680–86 (1997), discloses that $CO_2$ can be converted into hydrocarbonaceous products of similar structure and composition as obtained with CO. Also, "Kinetics of $CO_2$ hydrogenation on a K-promoted Fe Catalyst," Thomas Riedel and Georg Schaub, Industrial and Engineering Chemistry Research, 40/5 1355–1363, discloses that $CO_2$ can be converted into hydrocarbonaceous products of similar structure and composition as obtained with CO. Riedel and Schaub discloses that preferred operating temperatures are below 360° C. to prevent rapid carbon deposition on the catalyst.

Similarly, "Iron Catalyzed $CO_2$ Hydrogenation to Liquid Hydrocarbons," Fourth International Carbon Dioxide Utilization Conference (Kyoto, Japan Sep. 7–11, 1997) Studies in Surface Science and Catalysis, V114, 339–44 (1998), discloses that many catalysts useful in Fischer-Tropsch synthesis can also catalyze $CO_2$ hydrogenation to hydrocarbons.

Although multiple Fischer-Tropsch reactors have been used, an integrated system employing multiple Fischer-Tropsch reactors wherein hydrocarbonaceous products from different stages are blended has not been utilized to reduce $CO_2$ emissions.

As a result, there is an urgent need for a process that can reduce $CO_2$ emissions from syngas conversion processes while still being able to generate desired hydrocarbonaceous products.

SUMMARY OF THE INVENTION

The present invention satisfies the above objectives by providing a process that uses multiple reactors to control $CO_2$ emissions generated from a syngas conversion process. By using multiple reactors, the present invention avoids the need for costly $CO_2$ isolation processes.

The process according to the present invention, for the conversion of syngas using multiple Fischer-Tropsch reactors, includes reacting at least a portion of a first syngas, comprising at least about 2 vol % $CO_2$, in a first Fischer-Tropsch reactor to form a first hydrocarbonaceous product and a second syngas comprising at least about 2 vol % $CO_2$. The process also includes mixing the second syngas with a $H_2$-containing stream to form an adjusted syngas. The process further includes reacting at least a portion of the adjusted syngas in a second Fischer-Tropsch reactor to form a second hydrocarbonaceous product and a third syngas comprising a reduced amount of $CO_2$ than was present in the adjusted syngas. Finally, the process includes blending at least a portion of the first and second hydrocarbonaceous products to obtain a blended hydrocarbonaceous product.

According to another aspect of the present invention, the process for the conversion of syngas using multiple Fischer-Tropsch reactors includes forming a first syngas comprising at least about 2 vol % $CO_2$. The process also includes reacting at least a portion of the first syngas in a first Fischer-Tropsch reactor to form a first hydrocarbonaceous product and a second syngas comprising at least about 2 vol % $CO_2$. The process further includes mixing the second syngas with a $H_2$-containing stream to obtain an adjusted syngas having a molar ratio of $H_2$:(CO+$CO_2$) of at least about 1.0, and preferably between about 1.0 and about 8.0. The process also includes reacting at least a portion of the adjusted syngas in a second Fischer-Tropsch reactor to form a second hydrocarbonaceous product and a third syngas comprising a reduced amount of $CO_2$ than was present in the adjusted syngas. Finally, the process includes blending at least a portion of the first and second hydrocarbonaceous products. In a preferred embodiment, the process can further include converting at least a portion of the blended hydrocarbonaceous product into at least one product selected from the group consisting of jet fuel, diesel fuel, lubricant base oil, naphtha, and combinations thereof.

In yet another embodiment of the present invention, the process includes reacting at least a portion of a blended syngas comprising a first syngas and containing at least about 2 vol % $CO_2$ in a first Fischer-Tropsch reactor to form a first hydrocarbonaceous product and a second syngas comprising at least about 2 vol % $CO_2$. The process also includes mixing the second syngas with a $H_2$-containing stream to form an adjusted syngas. The process further includes reacting at least a portion of the adjusted syngas in a second Fischer-Tropsch reactor to form a second hydrocarbonaceous product and a third syngas comprising a reduced amount of $CO_2$ than was present in the adjusted syngas. The process also includes blending at least a portion of the first and second hydrocarbonaceous products to obtain a blended hydrocarbonaceous product. Finally, the process includes recycling at least a portion of the third syngas to be mixed with the first syngas to form the blended syngas.

According to a further aspect of the present invention, a Gas-to-Liquids facility includes a first Fischer-Tropsch reactor that reacts at least a portion of a first syngas, comprising at least about 2 vol % $CO_2$, to form a first hydrocarbonaceous product and a second syngas comprising at least about 2 vol % $CO_2$. The facility further includes a hydrogen source that provides hydrogen that mixes with the second syngas to form an adjusted syngas. The facility also includes a second Fischer-Tropsch reactor that reacts at least a portion of the adjusted syngas to form a second hydrocarbonaceous product and a third syngas comprising a reduced amount of $CO_2$ than was present in the adjusted syngas. Finally, the facility includes a blender that blends at least a portion of the first and second hydrocarbonaceous products to produce a blended hydrocarbonaceous product.

The process of the present invention, through the use of its multiple reactors, thereby realizes an important advantage in that it substantially minimizes $CO_2$ emissions generated from a syngas conversion process without having to employ costly $CO_2$ isolation processes such as, for example, $CO_2$ compression, liquefaction or solidification to isolate $CO_2$ from $CH_4$-containing gases. In addition, by blending at least a portion of the first and second hydrocarbonaceous products, the present invention can produce a blended hydrocarbonaceous product that substantially minimizes or eliminates the need for additional distillation and/or upgrading. Further, when at least a portion of the third syngas is recycled, the present invention provides a blended syngas that becomes enriched in methane as $CO_2$ is removed. The result is a process and facility that can operate more efficiently and economically in the production of hydrocarbonaceous products.

DETAILED DESCRIPTION OF THE PREFERRED EMBODIMENTS

In the present invention, $CO_2$ emissions from a syngas conversion process are effectively reduced by using multiple reactors.

Figure 1:
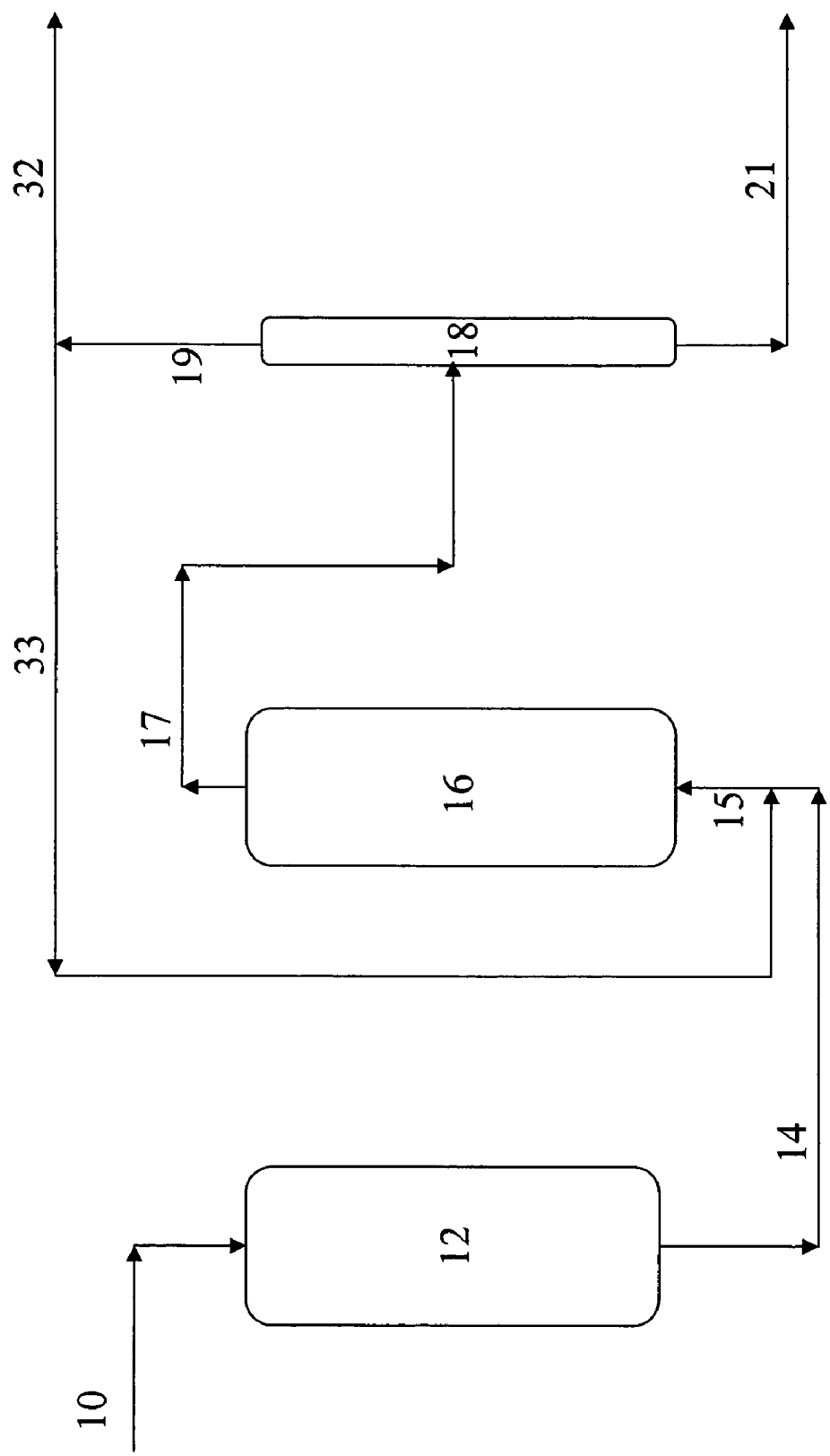
FIG. 1 is a schematic view of a conventional Fischer-Tropsch synthesis.

One such syngas conversion process is a Fischer-Tropsch process. Catalysts and conditions for performing Fischer-Tropsch reactions are well known to those of skill in the art, and are described, for example, in EP 0 921 184A1, the disclosure of which is hereby incorporated by reference in its entirety. A schematic of a conventional Fischer-Tropsch process is shown in FIG. 1.

The Fischer-Tropsch process can be understood by examining the stoichiometry of the reaction that occurs during a Fischer-Tropsch process. For example, during Fischer-Tropsch processing, synthesis gas (i.e., a mixture including carbon monoxide and hydrogen), is generated, typically from at least one of three basic reactions. Typical Fischer-Tropsch reaction products include paraffins and olefins, generally represented by the formula $C_nH_{2n+2}$. While this formula accurately defines mono-olefin products, it only approximately defines $C_{5+}$ paraffin products. The value of n (i.e., the average carbon number of the product) is determined by reaction conditions including, but not limited to, temperature, pressure, space rate, catalyst type and synthesis gas composition. The desired net synthesis gas stoichiometry for a Fischer-Tropsch reaction is independent of the average carbon number (n) of the product and is about 2.0, as determined by the following reaction equation:

$$nCO + 2nH_2 \rightarrow nH_2O + C_nH_{2n+2}$$

where $C_nH_{2n+2}$ represents typical Fischer-Tropsch reaction products such as, for example, olefins and paraffins. The amount of by-product water produced by the reaction is significant. For instance, when converting the molar ratios to weight ratios, one can see that the relative weight percentages of water to $CH_2$ hydrocarbons is 56%/44%.

The three general reactions that produce synthesis gas from methane are as follows:

1. steam reforming of methane: $CH_4 + H_2O \rightarrow CO + 3H_2$;
2. dry reforming, or reaction between $CO_2$ and methane: $CH_4 + CO_2 \rightarrow 2CO + 2H_2$; and
3. partial oxidation using oxygen: $CH_4 + \frac{1}{2}O_2 \rightarrow CO + 2H_2$.

Although the above general reactions are the basic reactions used to produce synthesis gas, the ratio of hydrogen to carbon monoxide produced by the above reactions is not always adequate for the desired Fischer-Tropsch conversion ratio of 2.0. For example, in the steam reforming reaction, the resulting ratio of hydrogen to carbon monoxide is 3.0, which is higher than the desired hydrogen to carbon monoxide ratio of 2.0 for a Fischer-Tropsch conversion. Similarly, in the dry reforming reaction, the resulting hydrogen to carbon monoxide ratio is 1.0, which is lower than the desired hydrogen to carbon monoxide ratio of 2.0. In addition to exhibiting a hydrogen to carbon monoxide ratio that is lower than the desired ratio for a Fischer-Tropsch conversion, the above dry reforming reaction also suffers from problems associated with rapid carbon deposition. Finally, because the above partial oxidation reaction provides a hydrogen to carbon monoxide ratio of 2.0, the partial oxidation reaction is the preferred reaction for Fischer-Tropsch conversions.

In commercial practice, an amount of steam added to a partial oxidation reformer can control carbon formation. Likewise, certain amounts of $CO_2$ can be tolerated in the feed. Thus, even though partial oxidation is the preferred reaction for Fischer-Tropsch conversions, all of the above reactions can occur, to some extent, in an oxidation reformer.

During partial oxidation, $CO_2$ forms because the reaction is not perfectly selective. That is, some amount of methane in the reaction will react with oxygen to form $CO_2$ by complete combustion. The reaction of methane with oxygen to form $CO_2$ is generally represented by the following reactions:

$$CH_4 + O_2 \rightarrow CO_2 + 2H_2$$

and $$CH_4 + 2O_2 \rightarrow CO_2 + 2H_2O.$$

Furthermore, steam added to the reformer to control coking, or steam produced during the Fischer-Tropsch reaction can react with CO to form $CO_2$ in a water gas shift reaction at various points in the process including in the syngas generator, in the syngas shift unit, and in the Fischer-Tropsch reactor. The reaction is represented by the following general reaction:

$$CO + H_2O \leftrightharpoons CO_2 + H_2.$$

In addition, light by-product gases, including $C_1$–$C_4$ hydrocarbons, are frequently used as fuel in furnaces. These fuels often include $CO_2$ from a GTL facility along with some unreacted CO. Moreover, during operation, a furnace provides heat that can contribute to the generation of substantial amounts of $CO_2$.

Thus, invariably a significant amount of $CO_2$ is formed during the conversion of methane into transportation fuels and lubricants by the Fischer-Tropsch process. The $CO_2$ produced during the Fischer-Tropsch process exits the Fischer-Tropsch/GTL process in a tail gas exiting the Fischer-Tropsch unit. Tail gases exiting a Fischer-Tropsch/GTL process comprise any gases that remain unconsumed by the Fischer-Tropsch process.

The overall proportion of carbon in methane that is converted to heavier hydrocarbon products has been estimated to be as high as about 68%. Thus, the remaining 32% can form significant amounts of $CO_2$. These estimates of carbon efficiency are provided, for example, by Bechtel Corporation for a GTL complex using cryogenic air separation, an autothermal reformer, a slurry bed Fischer-Tropsch unit and a hydrocracker for conversion of heavy wax into saleable products. See "$CO_2$ Abatement in GTL Plant: Fischer-Tropsch Synthesis," Report # PH3/15, November 2000, published by IEA Greenhouse Gas R&D Programme, the disclosure of which is hereby incorporated by reference in its entirety. Additionally, although the above estimates are provided for a specific GTL complex, it is believed that similar carbon efficiencies and $CO_2$ emissions would be produced by GTL processes employing alternative technologies.

The above equations represent general stoichiometric equations, and do not reflect an optimum synthesis gas composition for the kinetics or selectivity of a Fischer-Tropsch reaction. Moreover, depending on the nature of the Fischer-Tropsch catalyst, synthesis gas ratios other than 2.0, typically less than 2.0, are used to prepare the feed to a Fischer-Tropsch unit. However, because Fischer-Tropsch units typically produce products exhibiting a hydrogen to carbon ratio of about 2.0, the limiting reagent, typically $H_2$, is consumed first. The extra reagent, typically CO, is then recycled back to the Fischer-Tropsch unit for further conversion. Synthesis gas compositions having hydrogen to carbon ratios other than 2.0 are typically generated by recycling unused reagents.

In order to control the reaction, Fischer-Tropsch processes often operate at less than 100% conversion of the CO in the syngas. Typical conversion values are between about 40% and about 70% per pass. In Fischer-Tropsch processes that use $O_2$ (typically 99.5% purity), rather than air, unreacted syngas is recycled to the Fischer-Tropsch process. From the standpoint of economics and operational efficiency, preferred Fischer-Tropsch processes use a catalyst in a slurry bed. Also, from a practicality standpoint, the most common catalyst for use in slurry bed units contains cobalt. Cobalt does not promote the water-gas shift reaction or the reverse of the reaction. In these units, $CO_2$ is, for the most part, an inert gas. As syngas is recycled to the Fischer-Tropsch unit, its concentration builds up. As a result, the concentration of the reactive syngas components ($CO+H_2$) is effectively lowered, thereby reducing the rate of reaction. To compensate for the lower partial pressures of the reactive components, the pressure of the Fischer-Tropsch reactor is increased. During this recycle operation, a small amount of $CO_2$ in the initial syngas (typically about 5 vol % but always at least about 2 vol %) increases to much larger values (typically about 40 vol %).

In commercial practice, a portion of the $CO_2$-enriched recycled gas is typically recycled to a syngas generator where it promotes a dry reforming reaction and reduces the ratio of $H_2:CO$ in the syngas to a desired level. However, much more $CO_2$ is produced than can be consumed in the syngas generator. Thus, excess $CO_2$-enriched recycled gas is purged from the process and used as a low-energy content fuel. This low-energy-content fuel is a significant source of $CO_2$ emissions generated from syngas conversion processes.

In preferred embodiments of the present invention, a first syngas, preferably containing at least about 2 vol % $CO_2$, is reacted in a first Fischer-Tropsch reactor to produce a first hydrocarbonaceous product and a by-product of unreacted syngas having an increased $CO_2$ content. The by-product of unreacted syngas constitutes a second syngas. The second syngas may be mixed with a $H_2$-containing stream to form an adjusted syngas. Next, the second or adjusted syngas is reacted in a second Fischer-Tropsch reactor to produce additional hydrocarbonaceous product and a third syngas comprising a reduced amount of $CO_2$ than was present in the feed to the second Fischer-Tropsch reactor. Optionally, a $H_2$-containing stream may be added to the Fischer-Tropsch reactor if the second syngas stream is not mixed with a $H_2$-containing stream to form an adjusted syngas prior to entering the reactor. Further, at least a portion of the third syngas can be recycled to the first Fischer-Tropsch reactor for additional processing. That is, at least a portion of the third synthesis gas can be recycled to mix with the first syngas and optionally a $H_2$-containing stream to produce a blended syngas at least one of before, during or after entering the first Fischer-Tropsch reactor. Because the resulting blended syngas is rich in methane, the blended syngas is not only easier to burn, but also provides greater process control. Additionally, the hydrocarbonaceous products produced by the first two Fischer-Tropsch reactors can be combined to form a blended hydrocarbonaceous product. By blending the hydrocarbonaceous products to obtain a blended hydrocarbonaceous product, the present invention can substantially minimize or eliminate the need for further distillation and/or upgrading. As a result, the present invention is less costly and more efficient than conventional hydrocarbon product syntheses.

At least a portion of the blended hydrocarbonaceous product may be converted into more valuable products including jet fuel, diesel fuel, lubricant base oil, and naphtha. Furthermore, it may be desirable to combine one or more of these more valuable products.

The adjusted syngas, comprising the second syngas and a hydrogen containing stream, may be formed in situ in the second Fischer-Tropsch reactor. In such a case, both the second syngas and the hydrogen containing stream would be fed directly to the second Fischer-Tropsch reactor.

According to the present invention, the third syngas comprises a reduced amount of $CO_2$ than was present in the adjusted syngas, meaning that the adjusted syngas has a greater total amount or quantity of $CO_2$ than does the third syngas. Therefore, although the percent concentration of $CO_2$ in the third syngas may be greater than the percent concentration of $CO_2$ in the adjusted syngas, the third syngas comprises a reduced total amount or quantity of $CO_2$.

The blender that blends the hydrocarbonaceous products should be understood to include any suitable means for blending including, but not limited to, mixers, blenders, agitators and stirrers, including, for example, those described in Section 18 of Perry's Chemical Engineer's Handbook, Seventh Edition; (1997), the disclosure of which is hereby incorporated by reference in its entirety. Blending can be accomplished in a variety of ways commonly known to those of still in the art. By way of example, blending may be accomplished by sending the products to a common distillation unit or separator, as shown in the preferred embodiment described below. In such a case, the common distillation unit or separator would serve as the blender.

The $H_2$-containing stream can be mixed with the second syngas at least one of before, during or after entering the second Fischer-Tropsch reactor. The $H_2$-containing stream can be recovered from any number of sources in the Fischer-Tropsch process. Suitable sources of a $H_2$-containing stream include, but are not limited to, syngas, unreacted gas streams from the syngas conversion unit, gas streams associated with a hydrotreater/hydrocracker used for upgrading the product, gas streams associated with a reformer used to make an aromatic product, steam reforming of $CH_4$, combinations thereof and the like. With regard to steam reforming of $CH_4$ as a source of a $H_2$-containing stream, a steam reforming reactor may be needed to produce a $H_2$-containing stream for upgrading of $C_{10+}$ product, via hydrotreating and hydrocracking. The $H_2$-containing stream can be recovered using any suitable recovery process including, but not limited to, adsorption, absorption, cryogenic separation, membrane separation, combinations thereof and the like. Additionally, while it is preferable to use recovered hydrogen, it is also acceptable to supplement or replace recovered hydrogen with hydrogen obtained from alternative sources. $CO_2$ is a by-product of steam reforming. Since this $H_2$-containing steam will be reacted with $CO_2$ from other sources, it is not essential that the $CO_2$ (or CO) be removed from it prior to reaction. If $CO_2$ and CO removal are needed from the portion of the $H_2$ intended for upgrading of the $C_{10+}$ product, this recovered $CO_2$ and CO can be reacted along with the other sources of $CO_2$.

In the processes of the present invention, suitable Fischer-Tropsch reactors include, but are not limited to, slurry bed reactors, fixed bed reactors, fluidized bed reactors, combinations thereof and the like. The first Fischer-Tropsch reactor is preferably a slurry bed reactor that contains a Co catalyst. Additionally, process conditions during operation of the first Fischer-Tropsch reactor and the catalyst used therein are preferably selected so that the water gas shift reaction occurring therein is not promoted to an appreciable extent.

A feature of the second Fischer-Tropsch reactor is that it is capable of converting $CO_2$. Catalysts that do so are called Shifting Fischer-Tropsch catalysts. Preferably, the second Fischer-Tropsch reactor contains an iron catalyst. In the second Fischer-Tropsch reactor $CO_2$ is converted into additional hydrocarbonaceous product and a second unreacted syngas having a reduced $CO_2$ content. The $H_2$-containing stream added to both the first and second Fischer-Tropsch reactors should contain essentially no sulfur, as both cobalt-catalyzed and iron-catalyzed Fischer-Tropsch catalysts are readily poisoned by sulfur, and >50% $H_2$, but may contain impurities such as hydrocarbons, inert gases, $N_2$, and light alcohols.

In addition to minimizing $CO_2$ emissions, the processes of the present invention also provide more efficient conversion of syngas into valuable hydrocarbonaceous products. Sources of syngas suitable for the present invention, include, but are not limited to, $CH_4$, coal, hydrocarbonaceous products, combinations thereof and the like. Syngas can be derived from a combination of these sources by using syngas generators.

Suitable syngas generators, according to the present invention, can include a light hydrocarbon reformer or a heavy hydrocarbon reformer. Light hydrocarbon reformers can employ a variety of technologies including, but not limited to, steam reforming, partial oxidation, dry reforming, series reforming, convective reforming, autothermal reforming, combinations thereof and the like. Generally, light hydrocarbon reformers change the mixture of hydrocarbon products in a hydrocarbon product mixture. Regardless of the specific technology used, syngas will be produced from $CH_4$ and an oxidant such as, for example, $O_2$, $CO_2$, air, enriched air, combinations thereof and the like. The resulting gas product typically contains some $CO_2$ and steam, in addition to syngas.

Series reforming, convective reforming and autothermal reforming incorporate more than one syngas-forming reaction in order to better utilize the heat of reaction. The above processes for producing syngas or obtaining syngas from $C_1$–$C_3$ alkanes are well known in the art. Steam reformation is typically performed by contacting $C_1$–$C_3$ alkanes with steam, preferably in the presence of a reforming catalyst, at a temperature of about 1,300° F. (about 705° C.) to about 1,675° F. (about 913° C.) and a pressure of about 10 psia (about 0.7 bars) to about 500 psia (about 34 bars). Suitable reforming catalysts include, for example, nickel, palladium, nickel-palladium alloys, combinations thereof and the like.

Regardless of the system used to produce syngas, it is desirable to remove any sulfur compounds such as, for example, hydrogen sulfide and mercaptans, contained in the $C_1$–$C_3$ alkane feed. The removal of sulfur compounds can be achieved, for example, by passing the $C_1$–$C_3$ alkane gas through a packed bed sulfur scrubber containing a zinc oxide bed or other slightly basic packing material. If the amount of $C_1$–$C_3$ alkanes exceeds the capacity of the syngas unit, surplus $C_1$–$C_3$ alkanes can be used to provide energy throughout the facility. For example, excess $C_1$–$C_3$ alkanes can be burned in an upstream boiler to provide steam used in a thermal cracking step in the process of the present invention.

A heavy hydrocarbon reformer converts coal, heavy petroleum stocks or combinations thereof into syngas. The temperature in the reaction zone of the syngas generator is in the range of about 1,800° F. to about 3,000° F. and the pressure is in the range of about 1 atm to about 250 atm. The atomic ratio of free oxygen in the oxidant to carbon in the feedstock (i.e., O/C, on an atom to atom basis) is preferably in the range of about 0.6 to about 1.5 such as, for example, about 0.80 to about 1.3. The free oxygen containing gas or oxidant is selected from the group consisting of air, $O_2$-enriched air (i.e., about 21 mol % to about 95 mol % $O_2$) and substantially pure $O_2$ (i.e., at least about 95 mol % $O_2$). An effluent gas stream leaving the partial oxidation gas generator has the following composition in mol %, depending on the amount and composition of the feed streams: about 8.0 to about 60.0 $H_2$, about 8.0 to about 70.0 CO, about 1.0 to about 50.0 $CO_2$, about 2.0 to about 75.0 $H_2O$, about 0.0 to about 30.0 $CH_4$, about 0.1 to about 2.0 $H_2S$, about 0.05 to about 1.0 COS, about 0.0 to about 8.0 $N_2$ and about 0.0 to about 2.0 Ar. Entrained in the effluent gas stream is particulate matter comprising about 0.5 wt % to about 30 wt % particulate carbon, preferably about 1 wt % to about 10 wt % particulate carbon (based on the weight of carbon in the feed to the gas generator). Fly ash particulate matter can be present along with the particulate carbon and molten slag. Conventional gas cleaning and/or purification steps can also be employed. See, for example, U.S. Pat. No. 5,423,894 to Texaco, incorporated herein by reference in its entirety.

It should be recognized that $CO_2$ recycled to the first Fischer-Tropsch reactor serves a useful purpose. That is, $CO_2$ recycled to the first Fischer-Tropsch reactor serves as a diluent for reactive syngas components such as, for example, $H_2$ and CO. Inert $CO_2$ acts to dissipate heat generated during operation and can improve process control. As $CO_2$ is consumed by the second Fischer-Tropsch reactor, other inert gas components build up in the recycled gas. These inert components can include methane, $N_2$, Ar and other inert gas elements. Methane components can originate from unconverted methane in the syngas generator and methane formation that occurs in the first Fischer-Tropsch reactor. The $N_2$, Ar and other inert gas elements can be generated from an air separation unit or may also be obtained from an original natural gas feedstock. Normally, $CO_2$ is the most abundant inert gas component. However, when $CO_2$ is removed, in accordance with processes of the present invention, the concentration of other inert gas components can increase. These other inert gas components can act as a substitute for the removed $CO_2$ to improve management of heat released in the first Fischer-Tropsch reactor. As a result, more of the carbon (as carbon monoxide) in the recycled gas can be processed. The increased processing of carbon (as carbon monoxide) improves overall carbon efficiency as does the direct conversion of $CO_2$ to products in the second Fischer-Tropsch reactor. Carbon efficiency is defined as the ratio of $C_{3+}$ products to feed methane in the process. However, because of the increased concentration of other inert gas components, it may eventually be necessary to purge the other inert gas components from the system to be used in other applications, thereby producing a methane-enriched gas. In normal operation, the purged gas is rich in $CO_2$ and has a low heating value making its use limited. However, according to the present invention, the purged gas will be depleted in $CO_2$ and enriched in other gases, typically methane, thus increasing its heating value and uses.

In the recycling gas operation, the composition of the blended syngas, introduced to the first Fischer-Tropsch reactor, will change as the second Fischer-Tropsch reactor converts $CO_2$ into other products. That is, the concentration of other inert gas components will increase, and the concentration of reactive syngas components will remain essentially constant. As previously explained, the blended syngas is a combination of the first syngas, from the syngas generator, and the third syngas, that is recycled to the first Fischer-Tropsch reactor. The following table provides typi cal ranges of syngas compositions for a process that generates syngas from an $O_2$ source of about 99.5% purity.

| Component, mol % | Typical FT Unit without $CO_2$ conversion | With low level of $CO_2$ conversion | With moderate level of $CO_2$ conversion | With high level of $CO_2$ conversion |
|---|---|---|---|---|
| $H_2$ | 30 | 30 | 30 | 30 |
| CO | 40 | 40 | 40 | 40 |
| $CO_2$ | 20 | 15 | 10 | 5 |
| $N_2$ + Ar | 2 | 3 | 4 | 6 |
| $C_{1+}$ Hydrocarbons | 8 | 12 | 16 | 19 |

It should be recognized that not all of the syngas from the first reactor needs to be processed in the second reactor. Because $CO_2$, as an inert, builds up slowly and reasonable concentrations of $CO_2$ can be tolerated (e.g., about 60 mol %), only a portion of the syngas from the first reactor needs to be processed in the second reactor to achieve a desired $CO_2$ conversion. Accordingly, the size of the second Fischer-Tropsch reactor can be relatively small.

In certain circumstances, it is undesirable to process syngas from the first Fischer-Tropsch reactor and then recycle the $CO_2$-depleted syngas back to the first reactor. It has been surprisingly discovered that a reduction in $CO_2$ emissions can also be achieved by using a portion of the unreacted syngas from a first Fischer-Tropsch reactor as a feed to a second Fischer-Tropsch reactor.

Water is a natural product of the Fischer-Tropsch and synthesis gas generation reactions. Preferably, water generated from both the first and second reactors and the syngas generator is separated from the syngas products and the hydrocarbonaceous products. If not removed, the water can promote undesirable reverse water gas shift reactions that can convert CO into additional $CO_2$.

Figure 2:
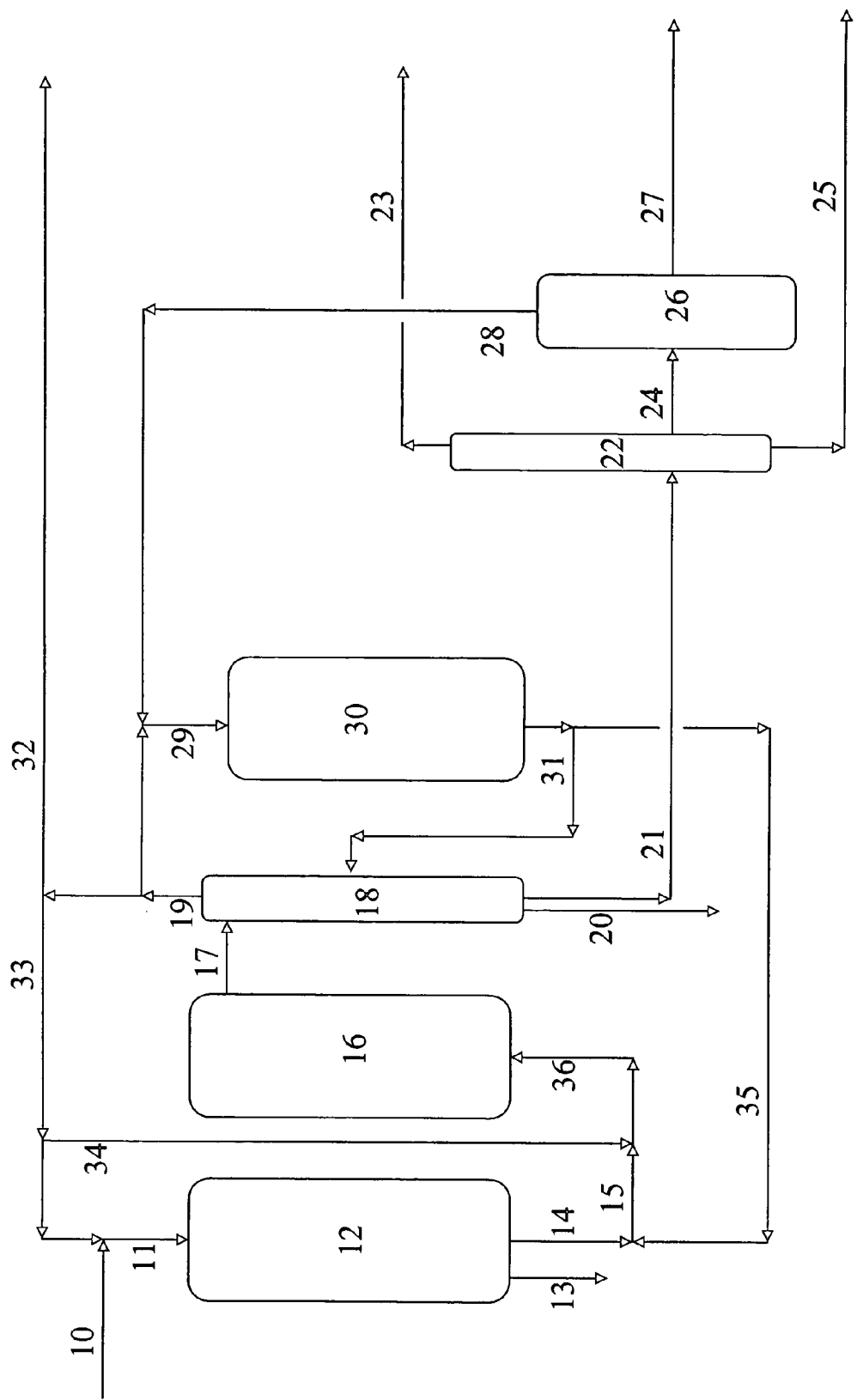
FIG. 2 is a schematic view of an exemplary embodiment of a syngas conversion process of the present invention.

A preferred embodiment of the present invention is depicted in FIG. 2. In this embodiment, a feedstream 10 comprising $CH_4$, $O_2$, $H_2O$, and optionally $CO_2$ enters a syngas generator 12. The syngas generator 12 generates water 13 and a first syngas stream 14. The syngas formed in the syngas generator 12 is cooled, and water 13 is removed after being condensed. Additionally, the first syngas stream 14 exits the syngas generator 12 and enters a first Fischer-Tropsch reactor 16, which generates stream 17 comprising a second syngas and a first hydrocarbonaceous product along with water.

Stream 17, containing the second syngas, exits the first Fischer-Tropsch reactor 16 and enters a first separator 18, which separates an unreacted by-product stream 19, a water stream 20 and a hydrocarbonaceous stream 21, comprising $C_{5+}$ liquids. The water stream 20 exits the first separator 18. A portion of the unreacted gas stream 19 enters a second Fischer-Tropsch reactor 30. Separator 18 is a generalized representation of the product separation, representing one or more separation zones, some of which may be internal to the Fischer-Tropsch reactor, and some of which may be external to the Fischer-Tropsch reactor.

A second Fischer-Tropsch synthesis is conducted in the second Fischer-Tropsch reactor 30 generating stream 31 comprising a third syngas and a second hydrocarbonaceous product along with water. Stream 31, containing the third syngas, exits the second Fischer-Tropsch reactor 30 and is recycled to the first separator 18. The hydrocarbonaceous product stream 21 exits the first separator 18 and enters a second separator 22. The second separator 22 separates the hydrocarbonaceous product stream 21 into a product stream 23 comprising $C_1$–$C_5$, having a H:C ratio of about 2.0, a product stream 24 and a $C_{10+}$ product stream 25, having a H:C ratio of about 2.0.

The product stream 24 exits the second separator 22 and enters a naphtha reformer 26. The naphtha reformer 26 upgrades the product stream 24 to produce a $C_6$–$C_{10}$ product stream 27, having a H:C ratio below about 2.0. The naphtha reformer 26 also generates a $H_2$-containing stream that exits the naphtha reformer 26 in a stream 28 that is recycled to be mixed with the unreacted gas stream 19, exiting the first separator 18, prior to entering the second Fischer-Tropsch reactor 30. The stream 28 mixes with the unreacted gas stream 19 so that a mixture comprising both unreacted gas, from the first separator 18, and a $H_2$-containing stream, from the reformer 26, enters the second Fischer-Tropsch reactor 30 in a mixed stream 29. Thus, mixed stream 29 is the adjusted syngas mentioned earlier.

Additionally, a portion of the unreacted gas stream 19, exiting the first separator 18, can be divided into two additional streams. The first stream can be comprised of excess unreacted gas comprising CO, $H_2$ and $CO_2$. This stream exits the process in an exit stream 32, to be used as fuel. The second stream can be recycled in a stream 33 to be mixed with the feed gas 10, producing a mixed feed gas 11 that enters the syngas generator 12. At least a portion of the third syngas in the second product stream 31 is directed in a stream 35 to be blended with the first syngas stream 14, producing a blended syngas stream 15. Additionally, another portion of the unreacted gas stream 19 is recycled in a syngas recycle stream 33. The syngas recycle stream 33, mixes with the feed gas stream 10 producing a mixed feed gas stream 11 that enters the syngas generator 12. Also, a portion of the syngas recycle stream 33 can be directed in a stream 34 that mixes with the blended syngas stream 15, producing a mixed syngas stream 36 that is introduced into the Fischer-Tropsch reactor 16. Although the embodiment depicted in FIG. 2 comprises two Fischer-Tropsch reactors, additional reactors can be used as desired. For instance, additional reactors may be used in instances where even greater $CO_2$ reduction is desired.

Generally, the operating conditions for the second Fischer-Tropsch reactor used to convert $CO_2$ should be:

| Variable | Broad | Preferred |
|---|---|---|
| Pressure, Atmospheres | 1–20 | 10–18 |
| Temperature, ° C. | 250–425 | 300–360 |
| CO + $CO_2$ conversion, % | 10–70 | 30–50 |
| $H_2$:(CO + $CO_2$) ratio | 1–8 | 1.25–3 |

EXAMPLE

In initial operation of the following example, a first syngas is fed to a first Fischer-Tropsch reactor. A second syngas is recovered from the Fischer-Tropsch reactor and fed to a second Fischer-Tropsch reactor. A third syngas is recovered from the second Fischer-Tropsch reactor. This third syngas may then be blended with the first syngas to form a blended syngas, which would be fed into the first Fischer-Tropsch reactor.

A first synthesis gas is formed from $CH_4$ by reactions that include partial oxidation in a syngas generator. The $O_2$ used in the first syngas formation has a purity of about 99.5 vol %. The first syngas from the reactor contains about 5 vol %

$CO_2$. Water produced in the syngas generator is separated from other components and is disposed of. The first syngas is blended with a third syngas, forming a blended syngas. The blended syngas has a $CO_2$ content of about 10 vol %, and the blended syngas is processed in a first Fischer-Tropsch reactor that uses a Co-containing catalyst in a slurry bed-type reactor. The unreacted syngas (i.e., the second syngas), contained in the products from the first Fischer-Tropsch reactor has a higher $CO_2$ content, when expressed on the basis of $C_3^-$ and lower molecular weight species including inerts, than was present in the blended syngas.

The gas and liquid products from the first Fischer-Tropsch reactor are sent to a separation complex comprised of API separators, distillation columns and other standard equipment items. With a slurry bed reactor, effluent leaves the reactor in two or more streams, wherein at least one stream is a vapor stream and one stream is a liquid stream. The vapor stream leaving the first Fischer-Tropsch reactor contains the second syngas. The streams from the separation complex are comprised of water, hydrocarbonaceous products and unreacted syngas. Since a separation complex is needed for the products from the first and second syngas reactors, it is economically desirable to use a single separation complex for both reactors.

A portion of the syngas from the separator, that contains the second syngas along with some of the third syngas, is mixed with a $H_2$-containing stream, produced later in the process, to produce an adjusted syngas with a $H_2$:(CO+$CO_2$) ratio of about 2.0. The portion of the syngas from the separator is processed in a second Fischer-Tropsch reactor. The third syngas contained in the products from the second Fischer-Tropsch reactor comprises a reduced amount of $CO_2$, when expressed on the basis of CO, $H_2$ and $CO_2$, than was present in the syngas feed to the second Fischer-Tropsch reactor. In the second Fischer-Tropsch reactor, the $CO_2$ conversion is about 40%, the temperature is about 320° C. and the pressure is about 10 atmospheres.

The effluent from the second Fischer-Tropsch reactor is sent to the separation complex. The hydrocarbonaceous product from the separation complex is then further separated to provide a $C_5$ product, a $C_6$–$C_{10}$ containing product and a $C_{10+}$ containing product. The $C_{10+}$ containing product is converted into products that include, but are not limited to, diesel fuel having a H:C molar ratio of about 2.0 or greater. The $C_6$–$C_{10}$ containing product can be reformed to produce an aromatic product having a H:C molar ratio of below about 2.0 and $H_2$. The $H_2$-containing stream produced during reformation is recycled to the second Fischer-Tropsch reactor where it is used to convert the $CO_2$.

An additional portion of the syngas from the separation complex, containing the second syngas and third syngas, is mixed with the first syngas from the syngas generator, forming a blended syngas. The blended syngas is then processed in the first Fischer-Tropsch reactor.

While the present invention has been described with reference to specific embodiments, this application is intended to cover those various changes and substitutions that may be made by those of ordinary skill in the art without departing from the spirit and scope of the appended claims.

What is claimed is:

1. A process for the conversion of syngas using multiple Fischer-Tropsch reactors, the process comprising:
   a) reacting at least a portion of a first syngas, comprising at least about 2 vol % $CO_2$, in a first Fischer-Tropsch reactor to form a first hydrocarbonaceous product and a second syngas comprising at least about 2 vol % $CO_2$;
   b) mixing the second syngas with a $H_2$-containing stream to form an adjusted syngas;
   c) reacting at least a portion of the adjusted syngas in a second Fischer-Tropsch reactor to form a second hydrocarbonaceous product and a third syngas comprising a reduced amount of $CO_2$ than was present in the adjusted syngas; and
   d) blending at least a portion of the first and second hydrocarbonaceous products to obtain a blended hydrocarbonaceous product.

2. The process of claim 1, wherein the adjusted syngas has a molar ratio of $H_2$:(CO+$CO_2$) of at least about 1.0.

3. The process of claim 1, further comprising converting at least a portion of the blended hydrocarbonaceous product into at least one product selected from the group consisting of jet fuel, diesel fuel, lubricant base oil, naphtha, and combinations thereof.

4. The process of claim 1, further comprising recycling at least a portion of the third syngas so that the portion of the third syngas mixes with the first syngas to form a blended syngas.

5. The process of claim 1, wherein the first Fischer-Tropsch reactor is a reactor selected from the group consisting of a slurry bed reactor, a fixed bed reactor, a fluidized bed reactor and combinations thereof.

6. The process of claim 5, wherein the reactor is a slurry bed reactor comprising a Fischer-Tropsch catalyst that comprises cobalt.

7. The process of claim 1, wherein the second Fischer-Tropsch reactor comprises a catalyst, wherein the catalyst comprises iron.

8. The process of claim 1, wherein the adjusted syngas has a molar ratio of $H_2$:(CO+$CO_2$) of between about 1.0 and about 8.0.

9. The process of claim 1, wherein the second Fischer-Tropsch reactor is operated under conditions including a temperature between about 250° C. and about 425° C. and a pressure between about 1 atmosphere and about 20 atmospheres.

10. The process of claim 9, wherein the temperature is between about 300° C. and about 360° C. and the pressure is between about 10 atmospheres and about 18 atmospheres.

11. The process of claim 1, wherein $CO_2$ conversion in the second Fischer-Tropsch reactor is between about 10% and about 70%.

12. The process of claim 4, wherein a combination of the first syngas and third syngas comprises about 15% or less $CO_2$.

13. The process of claim 12, wherein the combination comprises about 10% or less $CO_2$.

14. The process of claim 1, further comprising mixing the hydrogen-containing stream with the second syngas at least one of before, during or after the second syngas enters the second Fischer-Tropsch reactor.

15. The process of claim 1, further comprising forming the first syngas.

16. The process of claim 15, wherein the molar ratio of $H_2$:(CO+$CO_2$) is between about 1.0 and about 8.0.

17. A process for the conversion of syngas using multiple Fischer-Tropsch reactors, the process comprising:
   a) forming a first syngas comprising at least about 2 vol % $CO_2$;
   b) reacting at least a portion of the first syngas in a first Fischer-Tropsch reactor to form a first hydrocarbonaceous product and a second syngas comprising at least about 2 vol % $CO_2$;

c) mixing the second syngas with a $H_2$-containing stream to obtain an adjusted syngas having a molar ratio of $H_2:(CO+CO_2)$ of between about 1.0 and about 8.0;

d) reacting at least a portion of the adjusted syngas in a second Fischer-Tropsch reactor to form a second hydrocarbonaceous product and a third syngas comprising a reduced amount of $CO_2$ than was present in the adjusted syngas;

e) blending at least a portion of the first and second hydrocarbonaceous products to produce a blended hydrocarbonaceous product; and f) converting at least a portion of the blended hydrocarbonaceous product into at least one product selected from the group consisting of jet fuel, diesel fuel, lubricant base oil, naphtha, and combinations thereof.

18. A process for the conversion of syngas using multiple Fischer-Tropsch reactors, the process comprising:

a) reacting at least a portion of a blended syngas comprising a first syngas and containing at least about 2 vol % $CO_2$ in a first Fischer-Tropsch reactor to form a first hydrocarbonaceous product and a second syngas comprising at least about 2 vol % $CO_2$;

b) mixing the second syngas with a $H_2$-containing stream to form an adjusted syngas;

c) reacting at least a portion of the adjusted syngas in a second Fischer-Tropsch reactor to form a second hydrocarbonaceous product and a third syngas comprising a reduced amount of $CO_2$ than was present in the adjusted syngas;

d) blending at least a portion of the first and second hydrocarbonaceous products to obtain a blended hydrocarbonaceous product; and e) recycling at least a portion of the third syngas to be mixed with the first syngas to form the blended syngas.

* * * * *